P. Prettyman,
Bedstead Fastening,
Patented Mar. 31, 1834
8130X
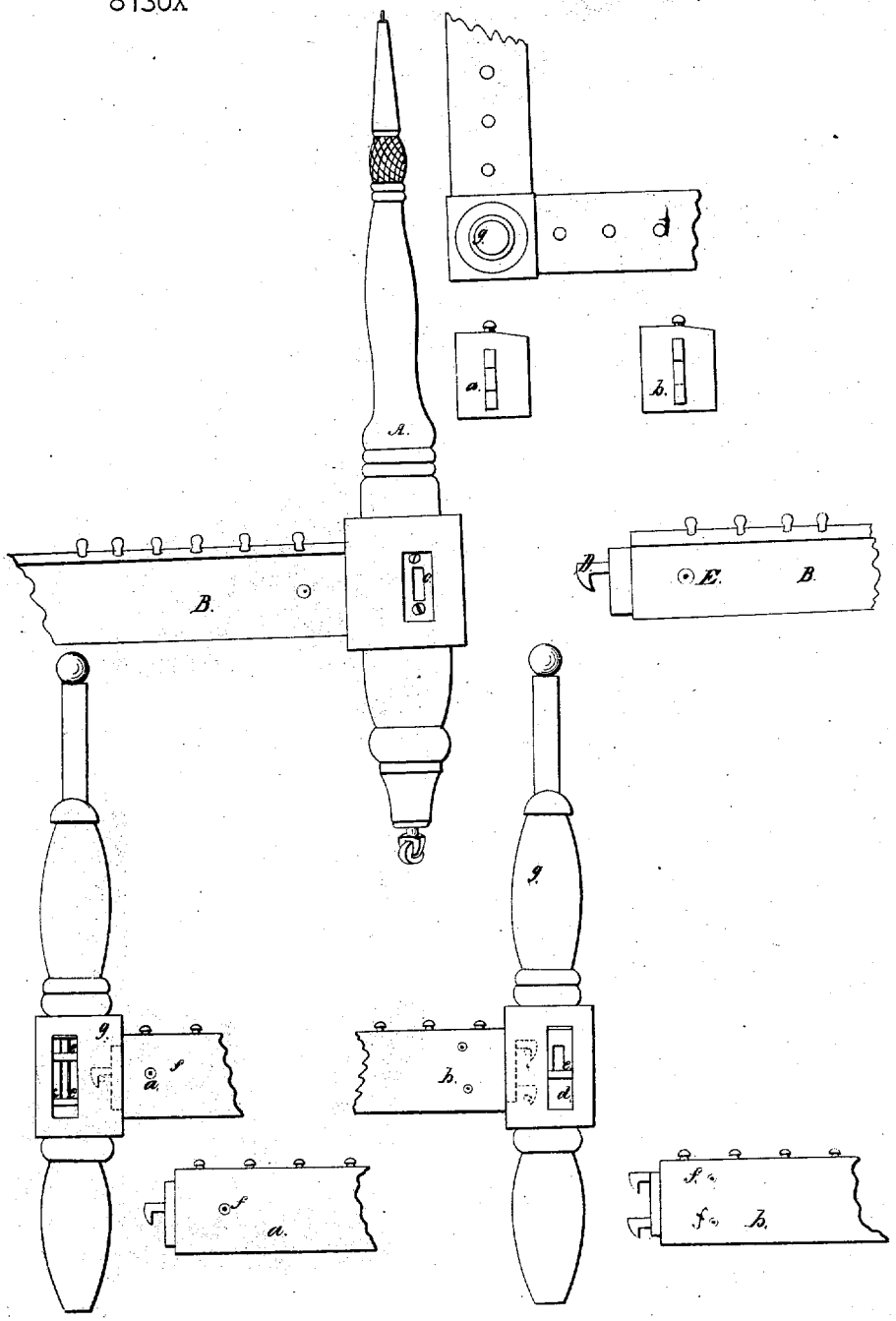
N. PETERS, PHOTO-LITHOGRAPHER, WASHINGTON, D. C.

Perry Prettyman of Georgetown, Delaware 8130X
Letters Patent

The schedule referred to in these Letters Patent and making part of the same, containing a description in the words of the said Perry Prettyman himself, of his improvement in the construction of Bedsteads —

---

To all to whom these presents shall come.
Be it known that I Perry Prettyman of Georgetown in the County of Sussex, & State
f Delaware, have invented a new and useful improvement in Bedsteads and that the
ollowing is a full and exact description of the construction & operation of the said im-
provement as invented by me. My improvement consists in the manner of fastening
r confining the rails, by a catch & strap instead of screws — —
After having constructed the bedstead (whether high post or low) in the ordinary way that is
ith short tenons (which should be one inch thick 3/4 long) on the ends of the rails, having
corresponding mortises in the posts — The upper side or edge of each tenon is then to be
notched down 3/4 of an inch, so as to permit the rail when the tenon is entered to be raised
by the hand 1/2 an inch or more, a shallow notch 1/4 of an inch is also to be made in
the lower edge of the tenons, to allow the rails to settle down as time or wear of the bed-
stead may require — Next a hole is to be bored in each of the tenons of about the same
size depth & direction, as those made to receive the screws in common use for bedsteads,
r it may if desired be made larger and deeper, according to the size of the square
shank of the hook or ketch which it is intended to receive and fit tight. This catch is
simply a square piece of wrought or cast iron from 1/2 to 3/4 of an inch broad 1/2 inch
thick and about 5 inches long resembling the catch to a common thumb latch of
a door except that the shank is of even thickness and the inner shoulder instead of being
square, stands oblique to and from the shank, forming the bearing of the rail as
will be hereafter seen; the extremity of the shank of the hook which enters the rail is
urnished with a hole for securing the hook, by the passage of a strong round wrought iron
pin (1/4 inch thick) through it and the rail — The manner of fixing the catches
in the rails is as follows; the holes in the tenons being bored, before the hooks are driven
in to within a short distance of their oblique shoulders the position of the hole in the
shank is to be first marked, as near as may be by measurement on the outside

8130X of the rail, a 5/8 inch hole is there to be bored to reach the shank, the shank is then driven in as above, and the hole in it being now seen a bit suiting the iron pin is to be passed through it and through the rail – the large hole first made, is then to be firmly closed by a solid wooden pin, and a hole bored through it with the bit last used from the reverse side of the rail; after which the iron pin is driven through from the outside of the rail and the catch is secured – There may be other methods used to bore this hole, but that here described will enable less expert workman to perform the operation quickly & correctly – In the bottom of each mortise of the posts, a heavy oblong wrought or cast iron, strap about 1/4 inch thick, of the breadth & length of the mortise, which is one inch by 3 3/8 inches long, is screwed firmly down by two wood screws about No 18 and 1/4 inch long, through this strap near the centre is an oblong square hole of a breadth and length just sufficient to receive the iron hook or catch in the rail, and placed rather nearer to the upper end of the strap, the wood behind the strap being sufficiently removed before the strap is screwed down, to permit the catch to enter the hole and take hold, and to allow a small space below the point of the hook to spare for the further depression of the hook by wear and use – The length of the hole in the strap must be regulated by the breadth of the catch, and the projection of the shoulder of the catch beyond the tenon, must be such that when the shoulder of the rail is drawn up or home to the post the middle, of the oblique shoulder of the catch, and of course the rail, bears on the lower edge of the oblong hole in the strap – by this arrangement the shoulders of the rails, are drawn into close contact with their respective posts – and with a force proportionable to the incumbent weight – .

To put this bedstead up it is only necessary to enter the tenons high as the mortises will admit, in which position the hooks will pass through the holes in the straps, and by then letting the rail down, the oblique side of the hook, takes on the lower edge of said hole, and the work is done – By reversing the operation it may be taken down with equal facility and dispatch, both operations being performed by the hands without tools –

– Now what I claim as my own invention and for which I ask letters patent, is the peculiar arrangement of the oblique shouldered hooks or catches fastened as herein described in the ends of the tenons of the rails and the straps, in the bottom of the mortises, so as to produce a firm close fitting connection of the parts, and at the same time easy to be put together or taken apart – –

In testimony that the foregoing is a true specification of my said invention and

8130X

227 improvement, I have hereunto subscribed my name this 29th day of March 1834 —

Witnesses

Sam^l P. Walker

Wm. J. Steiger

Perry Prettyman

Drawing

[132 words]

(Patented March 31. 1834.)